United States Patent [19]

Harrison

[11] Patent Number: 4,512,793
[45] Date of Patent: Apr. 23, 1985

[54] GRANULATION OF UREA PHOSPHATE FROM UREA AND MERCHANT-GRADE PHOSPHORIC ACID

[75] Inventor: Cecil P. Harrison, Florence, Ala.

[73] Assignee: Tennessee Valley Authority, Muscle Shoals, Ala.

[21] Appl. No.: 605,345

[22] Filed: Apr. 30, 1984

Related U.S. Application Data

[63] Continuation-in-part of Ser. No. 322,096, Nov. 16, 1981, Pat. No. T102,201.

[51] Int. Cl.³ .............................................. C05B 15/00
[52] U.S. Cl. .......................................... 71/29; 71/43; 423/306
[58] Field of Search ....................... 71/29, 43; 423/306

[56] References Cited

U.S. PATENT DOCUMENTS 3,912,802 10/1975 McCullough et al. ............. 71/43 X
3,967,948 7/1976 McCullough ............................ 71/29
4,217,128 8/1980 Stinson et al. .......................... 71/29

Primary Examiner—Ferris H. Lander
Attorney, Agent, or Firm—Robert A. Petrusek

[57] ABSTRACT

A process for direct granulation of unpurified urea phosphate from urea and merchant- or filter-grade wet-process phosphoric acid to produce a product with exceptional satisfactory physical and chemical properties for direct application to the soil or for use in production of fluid fertilizers. The process involves the utilization of sweep air in both the reactor and the granulator to remove water from the heat-sensitive urea phosphate mixture to enhance the granulation characteristics of the product. Product drying with applied heat after granulation is essentially eliminated. Moisture content of the urea phosphate is reduced to an acceptable level (about 1.0 percent) in the granulator; however, the granules are somewhat sticky. It has been found, however, that the resulting urea phosphate with about 1.0 percent moisture is less sensitive to heat than high (4 to 6 percent) moisture product. Consequently, heated air (up to about 200° F.) may be applied downstream from the granulator and into the dryer chiefly for control of relative humidity of ambient air introduced therein to less than 40 percent, thereby resulting in still further water removal and curing to effect a very dry and free-flowing product. This alternative is a viable expedient in geographic areas wherein the relative humidity of ambient air is normally in the range of about 50 percent and 80 percent.

8 Claims, 2 Drawing Figures

GRUM GRANULATION OF UREA PHOSPHATE

DIRECT GRANULATION OF UREA PHOSPHATE

GRUM GRANULATION OF UREA PHOSPHATE

GRANULATION OF UREA PHOSPHATE FROM UREA AND MERCHANT-GRADE PHOSPHORIC ACID

The invention herein described may be manufactured and used by or for the Government for governmental purposes without the payment to me of any royalty therefor.

This is a continuation-in-part of application Ser. No. 322,096, filed Nov. 16, 1981, now Defensive Publication No. T102,201, published Sept. 7, 1982, for Granulation of Urea Phosphate from Urea and Merchant-Grade Phosphoric Acid.

INTRODUCTION

The present invention relates to a process for the direct granulation of urea phosphate ($CH_4ON_2H_3PO_4$) from urea and merchant-grade (54 percent $P_2O_5$) wet-process phosphoric acid without removal of the congeneric impurities typical in such wet-process phosphoric acid and to the product resulting therefrom. More particularly, the present invention relates to the production of granular urea phosphate fertilizers that exhibit excellent handling properties and are eminently suitable for either applying directly to the soil or for the production of solution fertilizers. Still more particularly, the present invention relates to a novel method for moisture removal from a heat sensitive material and for successful granulation thereof, such as, for example, $CH_4ON_2.H_3PO_4$, without the requirement of first removing the congeneric impurities in the feed acid. Even more particularly, the gist underlying the inventive concept of the present invention employs the novel use of the step(s) of utilizing sweep air via air spargers, or the like, in the reactor means into which the feed stock is first combined in such a manner that upwards of about 70 percent of the free water in the resulting slurry is removed therefrom by mainly mechanical means rather than chemical phase change means. Substantially all of the remaining free water is similarly removed in the granulator immediately downstream from said reactor means.

RELATED APPLICATIONS

The present invention supplements at least in part the technical production considerations related to making readily available urea phosphate which may be utilized in the invention of application Ser. No. 308,875, Khasawneh, filed Oct. 5, 1981, and assigned to the assignee of the present invention, now Defensive Publication No. T102,902, published May 5, 1983. For purposes of teaching, disclosing, and claiming the instant invention, the teachings, disclosure, and claims of said No. T102,902, supra, are herewith and hereby incorporated herein by reference thereto.

BACKGROUND OF THE INVENTION

1. Field of the Invention

As is well known, nitrogen and phosphorus are two of three chemical elements that are essential macronutrients for living plants. The third essential macronutrient for living plants is potassium. Chemical nitrogen is usually applied to soil in solid forms, such as urea, ammonium nitrate, and ammonium sulfate and in solution forms, such as anhydrous ammonia, ureaammonium nitrate solutions, and various ammoniated or ammonia solutions; however, the most prevalent form of solid nitrogen used for agriculture today is urea.

As is also well known, there are certain drawbacks as well as advantabes for using solid urea for agriculture. Currently, urea affords the highest nitrogen content of all solid commercially available fertilizers. Among the other advantages of urea over that of ammonium nitrate in the agricultural market is that it is a nonhazardous material and can be transported by barge or other mode of transportation and can be handled at any port or distribution facility because it is not sensitive to detonation and does not burn, but decomposes to ammonia and biuret with heat. The relative ease with which urea decomposes by hydrolysis to ammonia and carbon dioxide has been recognized by the agronomist as a serious problem in that nitrogen applied in the form of urea to the soil and especially when applied to the soil surface can be lost by upwards of about 80 percent by decomposition and volatilization to the atmosphere. Ammonium nitrate, the second most highly used solid nitrogen containing commercial fertilizer, can be, under certain circumstances, considered a hazardous material and thereby its movement in the United States is limited as to mode of transport; consequently, rates incurred in its movement are greater than are rates for nonhazardous solid urea.

Agronomists have long recognized the disadvantageous characteristics of solid urea as a nitrogen fertilizer source. In an effort to overcome some of the disadvantages and drawbacks sometimes associated with the use of solid urea as a nitrogen fertilizer source, the research of Dr. Khasawneh at the Tennessee Valley Authority has led to the discovery that urea phosphate, which by itself, is an efficient nitrogen source, possesses the unique property of reducing nitrogen loss from urea with which it may be co-applied to soil surfaces. See Defensive Publication No. T102,902, supra.

2. Description of the Prior Art

In view of the discovery by Dr. Khasawneh, supra, and the envisioned future potential for urea phosphate, a study was made with the objectives in mind of developing a process for the direct granulation of urea phosphate product from urea and merchant-grade wet-process phosphoric acid without first removing the acid impurities. Prior art in the field of manufacture of urea phosphate fertilizers from urea and wet-process orthophosphoric acid of about 30 to 70 percent $P_2O_5$ concentration is well documented in the patent literature such as, for example, U.S. Pat. No. 3,713,802, Gittenait, which describes a process for reacting urea and wet-process phosphoric acid to form crystalline urea phosphate and for separating the relatively pure crystalline product from the mother liquor containing the acid impurities, e.g., iron, aluminum, calcium, magnesia, and fluorine. Prior art also in this field is described in other patents such as U.S. Pat. No. 3,936,501, Greidinger et al; Belgian Pat. No. 665,219, W. R. Grace and Co., Oct. 1, 1965; and German Pat. No. 2,100,413, Marcel Gittenait, July 15, 1971; all of which describe processes for producing urea phosphate from urea and phosphoric acid by crystallization and subsequent separation of the crystals from the mother liquor containing the acid impurities. Prior art also is described in a paper, "Production of Granulated Urea Phosphate Fertilizer in a Fluidized Bed," Soviet Chemical Industries 5 (8), August 1973. The process described in the paper involves reacting urea and phosphoric acid in a fluidized bed in the presence of hot (180° to 250° F.) air to cause granulation.

The urea melt and the acid are sprayed into the fluidized bed, the urea melt at least partially decomposes to liberate ammonium vapor, which vapor is reacted with and neutralizes said phosphoric acid. Also, the equipment required for effecting the described process is sophisticated and is not at this time conventional in the fertilizer industry. Furthermore, the heat requirement for granulation appears to make the process energy inefficient.

SUMMARY OF THE INVENTION

To produce solid urea phosphate by prior-art methods, urea and either wet-process phosphoric acid from which at least a substantial portion of the cogeneric impurities have been first removed or furnace grade phosphoric acid are readily reacted in solution to form urea phosphate. Other than the principal consideration of first removing the impurities from the wet acid by such expensive means as solvent extractions, etc., the remaining other difficult problem has been the subsequent removal of water to obtain a dry, solid, preferably granular form. The usual methods of evaporating water with heat are not applicable for drying because of the heat sensitivity of urea phosphate containing upwards of about 2.0 percent moisture.

On the other hand, difficulties inherent in removal of water by processes of the prior art have been overcome by the present invention in a more energy efficient process which can be used for the direct production of granular urea phosphate, with exceptionally satisfactory physical properties in regard to handling, from urea and merchant-grade wet-process phosphoric acid without removal of congeneric acid impurities therefrom.

The process comprising the instant invention involves the continuous feeding of either solid urea, urea melt, or urea solution of relatively low urea concentration (62 percent) and wet-process merchant-grade phosphoric acid, in proportions of 1 mole of urea per mole of phosphoric acid to a reactor of sufficient retention capacity to allow for complete chemical reaction of the urea and acid, and with provisions for adjusting by either heating or cooling the urea phosphate mixture to about 200° F. and for provision of sparging the mixture with sufficient sweep air to remove a substantial proportion of the water from the resulting slurry, i.e., upwards of about 70 percent. The partially dehydrated slurry mixture then is fed onto a bed of recycle material in a rotary drum granulator. During granulation relatively low (40 percent or less relative humidity) moisture air at a temperature not greater than about 115° F. (46° C.) is sparged underneath the rolling granulation bed to remove additional water and to improve flow characteristics in the granulator. A small amount of heated or unheated air cocurrent or countercurrent to flow of solids in the drum granulator, may or may not be required to remove moisture vapor and to promote the desired granulation.

Products made by the process of the present invention in the described manner consist of hard, desirably sized, free-flowing granules with good handling and storage properties. Granule hardness and stability increase even further during aging in storage. The granular material is eminently suitable for use in the agricultural industry.

It will be appreciated that the novel process comprising the instant invention should not be limited to granulation of urea phosphate alone, but should also be applicable to other slurry-granulation processes, including those used for production of monoammonium phosphate, diammonium phosphate, superphosphates, ammonium sulfate, nitric phosphates, and other acid-based and/or inert slurry-granulation processes.

DESCRIPTION OF THE DRAWINGS

The present invention will be better understood from a consideration of the following description taken in connection with the accompanying drawings in which.

Figure 1:
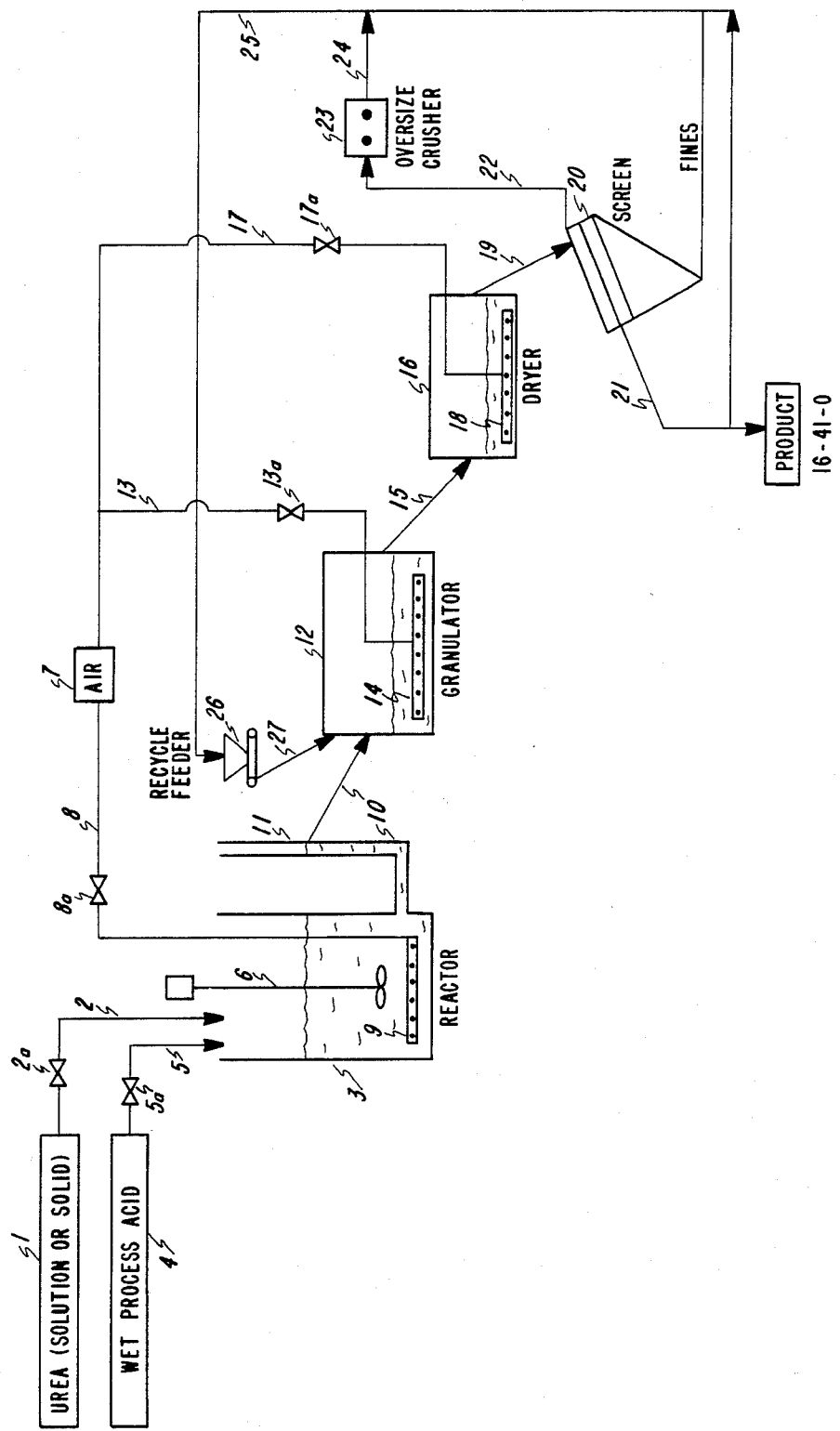
FIG. 1 is a flowsheet of the bench-scale plant generally illustrating the principles of my process which result in solid urea phosphate fertilizer, without the requirement for the removal of congeneric acid impurities, having the satisfactory physical properties, supra.

Referring now more specifically to FIG. 1, urea from source 1 may be introduced by means of line 2 and means for control of flow 2a into reactor 3 simultaneously with wet-process phosphoric acid from source 4 by means of line 5 and means for control of flow 5a into reactor 3 wherein the resulting mixture of urea and acid is agitated by mixer 6 and retained in reactor 3 for a sufficient period of time for reaction to form urea phosphate. Air from source 7 flows by means of line 8 and means for control of flow 8a to ring sparger 9 to cause a substantial portion of the water that was introduced with the acid and/or urea solution to be swept away and vented from the mixture. The urea phosphate-water mixture is continuously discharged from reactor 3 by means of constant level overflow line 10, which is equipped with siphon breaker 11 onto the granulation bed in rotary drum granulator 12. Air from source 7 flows by means of line 13 and means for control of flow 13a to sparger 14 to effect a decrease in the moisture content of granular material therein down to only about 1.0 percent to about 2.0 percent by weight of material which is sufficiently low to ensure a highly desirable granular product. Granular material from granulator 12 flows by gravity through chute 15 to dryer 16. Air from source 7 flows by means of line 17 and means for control of flow 17a to sparger 18 to cause mainly curing and in some cases to cause additional water removal. Granular urea phosphate from dryer 16 flows by gravity through chute 19 to screen deck 20 wherefrom product 21 is sized to minus 6 plus 10 Tyler mesh. The oversize material flows by gravity through chute 22 to crusher 23 where it is reduced to essentially minus 16-mesh size. Crushed oversize, together with fines from screen deck 20 and some product from chute 21 is transported to recycle feeder 26 where it is fed by chute 27 to granulator 12.

Figure 2:
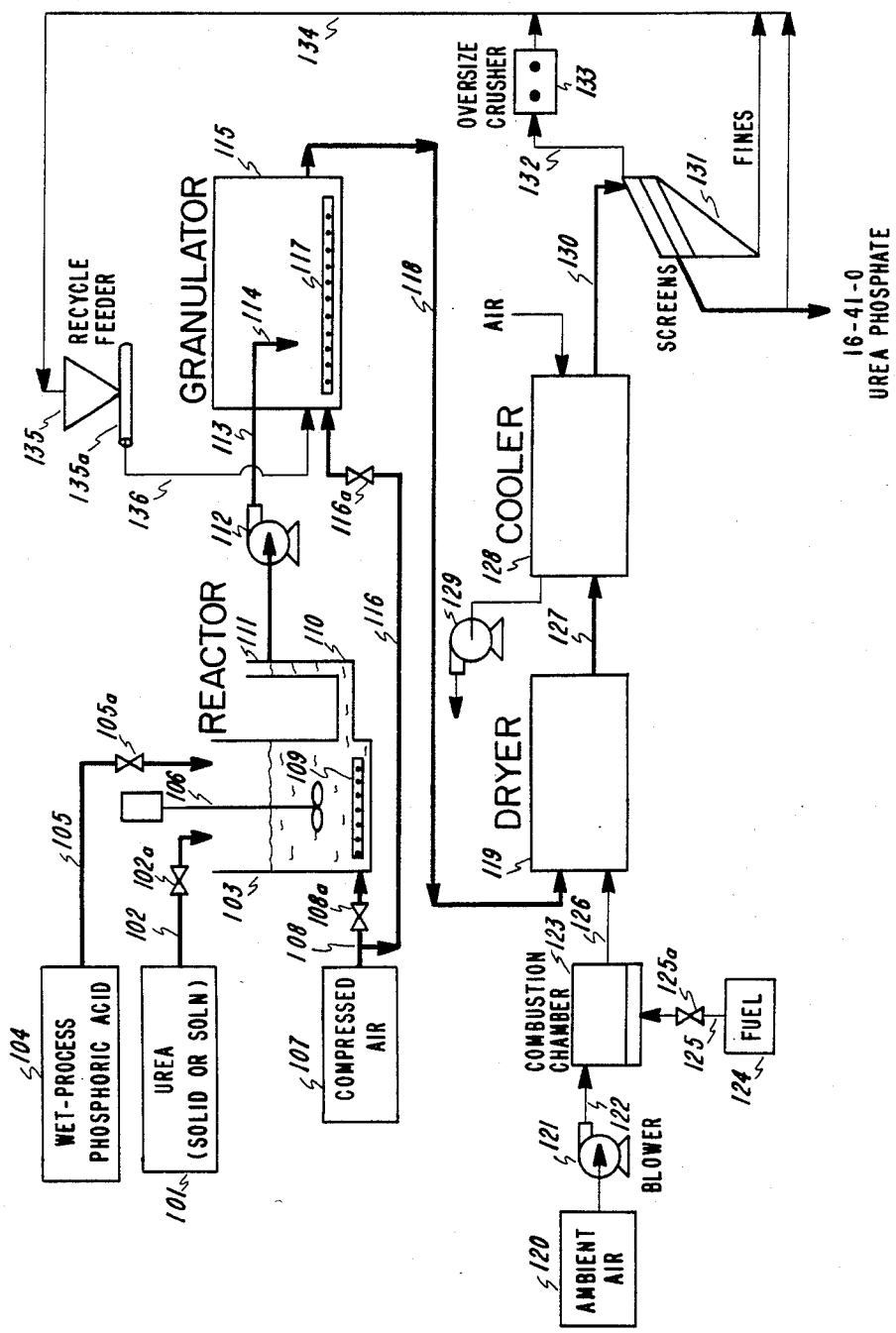
FIG. 2 is a flowsheet of the pilot-scale plant generally illustrating the principles of my process which result in solid urea phosphate fertilizer, without removal of acid impurities, having the satisfactory physical properties, supra. The pilot-scale plant is the preneutralizer-type design that is generally used for manufacture of monoammonium and diammonium phosphate.

Referring now more specifically to FIG. 2, urea from source 101 may be introduced by means of line 102 and means for control of flow 102a into reactor 103 simultaneously with wet-process phosphoric acid from source 104 by means of line 105 and means for control of flow 105a into reactor 103 wherein the resulting mixture of urea and acid is agitated by mixer 106 and retained in reactor 103 for a sufficient period of time for reaction to form urea phosphate. Air from source 107 flows by means of line 108 and means for control of flow 108a to cross-type sparger 109 to cause a substantial portion of the water that was introduced with the acid and/or urea solution to be swept away and vented from the mixture. The urea phosphate-water mixture is continuously discharged from reactor 103 by means of constant level overflow line 110, which is equipped with siphon breaker 111 to pump 112 and pumped through line 113 to spray nozzle 114 and sprayed onto the granulation bed in rotary drum granulator 115. Air from source 107 flows by means of lines 108 and 116 and means for control of flow 116a to sparger 117 to effect a decrease in the moisture content of granular material therein down to only about 1.0 to about 2.0 percent by weight of material which is sufficiently low to ensure a highly desirable granular product. Granular material from granulator 115 flows by gravity through chute 118 to dryer 119. Ambient air 120 flows by means of blower 121 and duct 122 to combustion chamber 123. Fuel from source 124 flows by means of line 125 and means for control 125a to combustion chamber 123 to effect combustion of the fuel. The 200° F. mixture of air and combustion products flow by means of duct 126 to dryer 119 to effect a decrease in the moisture content of granular material therein down to only about 1.0 to 2.0 percent by weight of material which is sufficiently low to ensure a highly desirable granular product. Granular material exiting from dryer 119 is transported by conveyor means 127 to cooler 128. Ambient air is caused to flow countercurrent to flow of granular material by blower 129 to effect a decrease in temperature of granular material therein. Granular material from cooler 128 flows by gravity through chute 130 to screen deck 131 where screened product is sized to minus 6 plus 10 Tyler mesh. The oversize material flows by gravity from screen 131 through chute 132 to crusher 133 where it is reduced to essentially minus 16-mesh. Some of the product from screen 131 together with fines from screen deck 131 and crushed oversize from crusher 133 are transported by conveyor 134 to recycle feeder 135. Recycle material from feeder 135 and means for control of flow 135a by gravity through chute 136 to granulator 115.

DESCRIPTION OF THE PREFERRED EMBODIMENTS

In order that those skilled in the art may better understand how the present invention can be practiced, the following examples are given by way of illustration only and not necessarily by way of limitation.

It should be pointed out perhaps that of the following examples, Examples I–IV represent work that was reported in my parent application Ser. No. 322,096, supra. The work reported in Example VI is a culmination of pilot plant data obtained in running the embodiments of my invention on pilot-plant rather than bench-scale equipment wherein the urea to phosphoric acid mole ratio in the product was directed at 1:1. Examples VII and VIII reflect the thinking dictated by discovery made subsequent to the reporting of my earlier work when it was later discovered that in products made according to my earlier dictates and wherein the weight ratios of nitrogen were targeted to be in the range of 3:1 to 2:1 weight ratio nitrogen:$P_2O_5$ in the final grade a considerable amount of monoammonium phosphate was found unexpectedly to exist in the product. Accordingly, my subsequent work is directed to means and methods to overcome such difficulties to ensure that at least a substantial amount of the final product in these weight grades approaches that reported and allegedly obtained in my earlier work. Example IX is a repeat of my original Example VII and is offered as a negative example to further illustrate the great benefits reaped by the use of sweep air in both the prior application and the present teachings.

EXAMPLE I

Solid air-prilled urea and merchant-grade (53.2 percent $P_2O_5$) wet-process phosphoric acid at temperatures of about 75° F. were fed continuously at rates for 8 pounds per hour of product and in proportions for a mole ratio of 1 mole of urea per 1 mole of phosphoric acid ($H_3PO_4$) to a reactor. Feed entry was at the top of the reactor. The reactor was a 1/16-inch type 316 stainless steel vessel that was $4\frac{1}{4}$ inches in diameter by 18 inches high; its outer walls and bottom were insulated with $2\frac{1}{2}$ inches of magnesia. Metered air at a flow rate of about $\frac{1}{2}$ CFM entered the reactor by means of a $\frac{3}{8}$-inch diameter ring-type sparger that had twenty 1/16-inch openings that faced downwardly. The ring-type air sparger was located about $\frac{1}{2}$ inch above the bottom of the reactor. Agitation in the reactor was effected by the use of a motor-driven shaft that was equipped with four three-bladed $1\frac{1}{2}$-inch diameter marine-type propellers; rotation of the shaft was about 1000 rpm. A submergible electrical heating element was used to adjust the reaction product temperature to about 200° F. Residence time in the reactor was about 40 minutes when the unit was operating to produce 8 pounds of product per hour. The urea phosphate slurry mixture was a free moisture content of about 4.5 percent by weight and at a viscosity of about 450 centipoises at 200° F. was discharged continuously from the bottom of the reactor through a $\frac{3}{4}$-inch diameter stainless steel gravity-type overflow pipe that was equipped with a siphon breaker, so as to cause the liquid level in the reactor to remain at a constant depth of 9 inches, onto a bed of recycle material in the rotary drum granulator. Without air-sweep in the reactor, the free moisture content of urea phosphate mixture entering the reactor was found to be about 8 to about 11 percent by weight and viscosity at about 200° F. was about 70 centipoises. At times, the free moisture content of the material introduced into the reactor was about 35 percent by weight.

The granulator was 12 inches in diameter by 14 inches long and was sloped 1 inch per foot from the feed end to the discharge end; rotation was 30 rpm. The drum was fitted with a $2\frac{7}{8}$-inch high and a $2\frac{1}{2}$-inch high retainer ring, respectively, at the feed and discharge ends. A closed-end $\frac{3}{8}$-inch stainless steel tube air sparger was positioned parallel to the axis of the drum and near the center of the granulation bed. Air from the sparger entered the bed through three 1/16-inch openings that were directed upstream with regard to passage of solids. The airflow rate to beneath the granulation bed was 2 CFM and the bed temperature was 85° F. Residence time in the granulator, when the production rate was 8 pounds per hour, was about 5 minutes.

Granular material containing less than about 2 percent by weight free water was discharged from the granulator and flowed by gravity to a rotary cooler that was 12 inches in diameter by 16 inches long. The unit was equipped with 2-inch high retainer rings located at the two ends of the vessel and with eight 1-inch high lifting flights that were evenly spaced in the vessel. The unit was operated on a slope of about 1 inch per foot from the feed end to the discharge end and was rotated at 30 rpm. In operation, a low velocity stream of ambient temperature air was passed through the unit counter-current to flow of solids. Residence time in the unit when producing 8 pounds per hour of product was about 1½ minutes. The temperature of material discharging from the cooler was 82° F., free moisture content was 1.4 percent by weight, and size distribution was 6 percent plus 6-mesh, 85 percent minus 6-plus 16-mesh, and 9 percent minus 16-mesh. Thus, from about one-half to about two-thirds of the free water was removed by air sweeping the reactor and substantially the rest of the free water was removed by air sweeping in the granulator with only a minor amount being removed in the cooler.

The cooler material was sized by screening on a deck of 6- and 10-mesh Tyler screens. Free moisture content of product (minus 6-plus 16-mesh size) was 1.4 percent by weight. Granule crushing strength of the minus 7-plus 8-mesh size granules was 4.7 pounds. Chemical analyses of the product revealed that the product grade was 16-41-0 and that no urea was hydrolzed during processing.

In carrying out the aforementioned test, there were no problems in handling and transport of materials.

EXAMPLE II

In another series of tests, granular urea phosphate with inclusion of all congeneric acid impurities was made from the same solid urea and wet-process phosphoric acid feed stock and with use of the same equipment and according to the same procedure as described in Example I, supra, except that heated air, instead of ambient temperature air, was passed through the granulator, but not beneath the bed, to cause the granulation bed temperature to be in the range of 130° F. to 140° F. Air at ambient temperature was sparged beneath the granulation bed. Products of 16-41-0 nutrient grade produced in this series of tests also were exceptionally satisfactory in regard to chemical and physical properties and also in regard to storage and handling properties. Free moisture content of the products was about 1.0 percent by weight and granule crushing strength of freshly made minus 7-plus 8-mesh granules was of the order of 4 to 5 pounds. In carrying out the test, no problems of materials handling were encountered.

EXAMPLE III

In this series of tests, urea phosphate of preferable granular form, in regard to chemical and physical properties, was made according to the teachings of the present invention from urea melt and merchant grade (53.2 percent $P_2O_5$) phosphoric acid. In these tests, the same equipment and the same procedures were used as those described in Example I, supra, except that in these tests, urea was fed to the reactor as hot (about 295° F.) melt to simulate feed stock from a urea synthesis unit; the proportion fed was for a 1:1 mole ratio of urea to phosphoric acid. Free moisture content of the product was 1:4 percent by weight and granule crushing strength of freshly made minus 7-plus 8-mesh granules was about 5 pounds. No problems in regard to materials handling were encountered.

EXAMPLE IV

In another series of tests, urea phosphate in preferable granular form, in regard to chemical and physical properties, was made according to the present invention from hot (230° F. to 250° F.) urea solution of concentrations ranging as low as 62 percent by weight of urea and from merchant-grade (53.7 percent $P_2O_5$) wet-process phosphoric acid. In these tests, the same equipment and the same procedures as described in Example I, supra, were used except that the reactor was operated at 185° F. instead of 200° F. The proportions of materials fed was for a 1:1 mole ratio of urea to phosphoric acid. Free moisture content of the product was 1.3 percent by weight and granule crushing strength of freshly made minus 7-plus 8-mesh granules was 4 to 6 pounds. No problems in regard to processing were encountered.

EXAMPLE V

In another series of tests, urea phosphate in preferable granular form, in regard to chemical and physical properties, was made according to the present invention from hot (230° F. to 250° F.) urea solution of concentrations as low as 75 percent by weight of urea and diluted (40 percent $P_2O_5$) merchant-grade wet-process phosphoric acid. In these tests, the same equipment and procedures as described in Example IV, supra, were used. In carrying out these tests, the proportions of materials fed was for a 1:1 mole ratio of urea to phosphoric acid. Free moisture contents of the products ranged from 1 to 2 percent by weight and granule crushing strength of freshly made minus 7-plus 8-mesh size granules was 4 to 6 pounds. No problems in regard to processing were encountered.

EXAMPLE VI

In a series of pilot-scale tests, urea phosphate of very preferable granular form, in regard to chemical and physical properties, was made according to the teachings of the present invention from solid air-prilled urea with biuret content of 0.3 percent and merchant-grade wet-process (53.7 percent $P_2O_5$) phosphoric acid feed stock and with use of pilot-scale equipment.

Equipment and Procedure

The equipment setup (FIG. 2) for granulation of UP was essentially the same as that commonly used for granulation of monoammonium phosphate (MAP) or diammonium phosphate (DAP). The preneutralizer (20-in diameter×60-in high) was used as the urea-acid reactor. Prilled urea was metered to the top of the reactor by means of a screw feeder; preheated acid (240°–250° F.) was fed by means of a metering pump. Air[1] was metered to the reactor by a rotameter and was distributed by means of a ½-inch cross-type sparger located at about 3 inches above the bottom of the vessel. Agitation was provided by a motor-driven agitator equipped with two six-bladed baffle-type propellers that operated at a tip speed of 10.5 feet per second. The reactor was equipped with a steam coil so that the solution temperature could be adjusted up to 200° F. Residence time in the reactor was about 25 minutes when the unit was operating at a production rate of 750 pounds per hour. The reaction mixture overflowed from a 2½-inch-diameter standpipe which was equipped with a siphon breaker to maintain the liquid level in the reactor at a constant depth of 20 inches. The reaction mixture overflow was pumped through a steam-jacketed line and sprayed by means of either a No. 10 or a No. 15 hollow-cone nozzle onto the granulation bed at the granulator.

[1]Plant supply; 80 lb/in$^2$g; 10–21% relative humidity.

The drum granulator was 3 feet in diameter by 6 feet long and was inclined with a slope of about 0.58 inch per foot from the feed end to the discharge end. The granulator was rotated at about 30 revolutions per minute and was fitted with retainer rings 9.5 and 9 inches high at the feed and discharge ends, respectively. The feed end of the granulator was open and the discharge end of the granulator was hooded. The granulator was equipped with an air sparger (a closed-end, ⅜-inch-diameter, stainless steel tube that contained forty-three ⅛-inch openings spaced 1¼-inch apart). The air sparger was positioned near the center of the granulation bed so that the sparger openings were directed upstream into the flow of solids. Air[1] was metered to the sparger by means of a rotameter. In operation, an exhaust system was used to remove air sparged to the unit and to cause a small stream of ambient air to flow through the granulator cocurrent to the flow of solids. This air stream removed water vapor from the unit and also provided additional cooling. Residence time in the granulator at a production rate of 750 pounds per hour was about 5 minutes.

The dryer was a rotary drum 3 feet in diameter by 24 feet long. The vessel was equipped with lifting flights. Retainer rings at the feed and discharge ends were 8 and 5 inches high, respectively. The unit was insulated with a 2-inch-thick layer of magnesia. The drum was rotated at 7 revolutions per minute. Drying air was supplied by blowers. The air first flowed through a propane combustion chamber where it was heated to 200° F.; then, the hot air, together with the combustion products, flowed through the dryer cocurrent to the flow of solids. Residence time in the dryer was about 20 minutes.

The cooler was rotary drum 2½ feet in diameter by 20 feet in length and was equipped with lifting flights. The retainers at the feed and discharge ends were 4½ and 3¼ inches high. The unit was rotated at 11 revolutions per minute. In operation, an induced blower was used to cause a stream of ambient air to flow countercurrent to the flow of solids through the unit. Residence time in the cooler was about 20 minutes.

In the startup operation, the system was loaded with recycle material from a previous operation. Then, the rotary equipment was put into operation, and the material was cycled, with heat applied at the dryer, to bring the temperature of the startup recycle to about 90° F. Urea and preheated acid feeds then were started to the reactor. As the reactor reached operating level, airflow was started, and the temperature of the mixture was adjusted to 200° F. by regulating the steam flow through the coil in the reactor. The mixture overflowing from the reactor was pumped to salvage until equilibrium at the reactor was established. Then, airflow beneath the granulation bed was started, and the mixture overflowing from the reactor was pumped to the granulator. Dried material discharging from the cooler was sized on the screen deck to minus 6-plus 16-mesh; the oversize was crushed and returned, along with the fines and some product, to the granulator as recycle.

During the pilot-plant run, representative samples of the feed materials, the reactor slurry, and the material discharged from the granulator, dryer, and cooler were collected and submitted for chemical analyses. Portions of the product were subjected to physical properties tests.

Test Conditions

Reactor Conditions: Prilled urea fed to the reactor was at ambient temperature (65° F.) and contained 0.3 percent biuret (Table I). The wet-process phosphoric acid fed to the reactor was preheated to about 240° F. to 250° F. and contained about 54 percent $P_2O_5$. The free moisture content of the acid was about 18 percent by weight. The temperature of the reaction mixture was controlled at a constant 200° F. by regulating the steam flow through the heating coil. About 40 cubic feet per minute of air was fed when the plant was operating at a production rate of 500 pounds per hour (test 23), and about 42 to 62 cubic feet per minute was fed when the production rate was 750 pounds per hour (tests 24, 25, and 26). The reaction mixture was held constant at a level 20 inches above the bottom of the reactor. A small amount of antifoam agent[1] was used to control foaming. Retention times in the reactor were 37 and 25 minutes, respectively, for the low and high production rates. Free moisture content of the mixture discharging from the reactor ranged from about 5.0 to 5.8 percent by weight; pH of the mixture was about 1.5.

[1]Sulfonate OA-5, oleic acid, Cities Service Co., Atlanta, Ga.

Granulator Conditions: Overall, granulation was good; about 90 percent of the granulator discharge was onsize (−6+16 mesh), and there was essentially no oversize (Table I). The recycle-to-product ratio was about 5.5:1. During most of the pilot-plant operation, the recycle feed temperature was about 100° F., and the temperature of the granular discharge was about 122° F. Air was fed to the granulator sparger at a temperature of 72° F. and at a rate of 123 cubic feet per minute. Moisture content of the granular discharge was from 0.7 to 1.3 percent by weight.

Dryer Conditions: The temperature of the air fed to the dryer (about 600 ft³/min) was controlled at a constant 200° F. with use of a propane burner. The temperature of the air exiting the dryer was about 120° F.; temperature of the dried UP was about 105° F. Moisture content of the granular product was decreased by about 0.1 percent in the dryer.

Cooler Conditions: Air at ambient temperature (70° F.) was fed to the cooler at a rate of about 705 ft³/min (Table I). Exit air temperature was about 105° F. The temperature of the granular material discharging from the cooler was about 105° F.

Screening and Crushing Conditions: The granular material was sized on a minus 6-plus 10-mesh screen deck. The overall screening operation was good, and there was no buildup of material on the screens or in the crusher during the 3-day operation. Screen analysis (Table I) of the material fed from the cooler to the screen showed that about 1 to 10 percent of the granules were oversize (+6 mesh) and about 4 to 9 percent of the granules were undersize (−16 mesh). Screen analysis of the product showed that essentially all of the granules were in the size range of minus 6 plus 16 mesh. The size distribution of the product granules also indicates that the material should be very suitable for bulk blending with other popular blend materials.

Dust Collection Conditions: Dust collected by the cyclone collection system amounted to 1 to 3 percent of the nominal production rate (750 lb/hour). Dust collected by the baghouse amounted to 6 to 9 percent of the nominal production rate.

PRODUCT QUALITY

Chemical Analysis

Analytical data (Table I) show that the product was ongrade. Nitrogen contents ranged from about 16.3 to 17.1 percent, and $P_2O_5$ contents ranged from 40.1 to 41.3 percent. Polyphosphate contents ranged from 1 to 2 percent of the total $P_2O_5$. All of the $P_2O_5$ was citrate soluble, and 99 percent of the $P_2O_5$ was water soluble. Biuret content was less than 0.2 percent, and pH was 1.5. Moisture (AOAC) was 0.7 to 1.1 percent by weight.

Physical Properties

Results of the physical properties tests[1] are presented in Table I and are discussed in the following paragraphs.

[1] Procedures given in TVA Bulletin Y-147.

Particle Size: As shown in Table I, the products from the various sample periods were well screened; there were essentially no minus 16-mesh fines or plus 6-mesh oversize material.

Hardness: The granule hardness (crushing strength of $-7+8$ mesh granules) was 4 to 5 pounds when freshly made (not shown on table) and about 8 to 9 pounds after aging for 2–4 weeks. The granule hardness of commercial MAP, a product with good granule stability, is in the range of 4 to 9 pounds.

Abrasion-Shatter Resistance: Degradation in the standard test was 1.4 percent, which is about the same as that for commercial MAP.

Density: Loose-pour densities of the products ranged from 53 to 58 pounds per cubic foot. Apparent specific density was about 1.63 grams per cubic centimeter.

Critical Relative Humidity: Critical relative humidity of the UP was in the range of 50 to 55 percent at 86° F. and in the range of 40 to 45 percent at 120° F. (not shown on table). For comparison, the critical relative humidity of ammonium nitrate is 55 to 60 percent at 86° F. and 45 to 50 percent at 120° F.

Angle of Repose: Angle of repose of the pilot-plant granular UP products was 39 degrees. For comparison, the angle of repose of commercial MAP is 38 to 42 degrees.

Bag-Storage Tests: After 12 months of storage in 50-pound-capacity bags, tests showed that unconditioned material (1.0 percent $H_2O$) was in excellent condition (0 to only 2 percent of light lumps).

Bulk-Storage Tests: After 12 months of exposure to ambient warehouse conditions, unconditioned UP was in very satisfactory condition. Moisture penetration was to a depth of only 1 inch. The granules in the moisture affected area were soft, and the surface (½-inch layer) granules were light caked. Below the moisture-affected portion, the material was caked to a degree of only light to medium pile set; granules were dry and hard.

TABLE I

Pilot-Plant Granulation of 16-41-0 Grade Urea Phosphate Directly from Urea and Wet-Process Phosphoric Acid

| Run No. | DP-10 | DP-11 | | |
|---|---|---|---|---|
| Test No. | 23 | 24 | 25 | 26 |
| Sampling Time | 8:30–9:30 pm 1/26/83 | 9:30–10:15 pm 1/27/83 | 5:00–6:00 pm 1/28/83 | 9:30–10:30 pm 1/28/83 |
| Production Rate, lb/h | 500 | 750 | 750 | 750 |
| Formulation | | | | |
| Urea (0.3% biuret) | | | | |
| Feed temp, °F. | | 65 | | |
| Feed rate, lb/h | 190 | 285 | 285 | 285 |
| Phosphoric acid | | | | |
| $P_2O_5$, % | 53.5 | 53.9 | 53.9 | 53.6 |
| Free $H_2O$, % | 17.8 | 18.3 | 18.2 | 17.9 |
| Water-insoluble solids, % | 1.4 | — | — | — |
| Feed temp (at reactor), °F. | 240 | 250 | 250 | 250 |
| Feed rate, lb/h | 420 | 630 | 630 | 630 |
| Reactor Conditions | | | | |
| Reactor temp, °F. | | 200 | | |
| Retention time, min | 37 | 25 | 25 | 25 |
| Airflow through reactor, ft³/min | 40 | 42 | 54 | 62 |
| Exhaust pressure, in $H_2O$ | | 4 | | |
| Slurry head above sparger, in | | 16 | | |
| UP slurry | | | | |
| Temp (at granulator), °F. | 210 | 205 | 200 | 200 |
| Chemical analysis, wt % | | | | |
| Total N | 15.7 | 16.4 | 15.5 | 15.7 |
| $NH_3$—N | 0.4 | 0.1 | <0.1 | 0.2 |
| Total $P_2O_5$ | 38.8 | 37.8 | 40.2 | 39.7 |
| Free $H_2O$ | 5.4 | 5.8 | 5.0 | 5.6 |
| Urea: $H_3PO_4$ mole ratio | 1.02:1 | 1.1:1 | 0.97:1 | 1:1 |
| pH (10% UP in $H_2O$) | 1.4 | 1.5 | 1.4 | 1.5 |
| Granular Conditions | | | | |
| Type distributor, nozzle | No. 10 cone | | No. 15 cone | |
| Drum rotation, r/min | | | 30 | |
| Recycle feed | | | | |
| Recycle ratio lb/lb product | 5.5 | 6.5 | 5.2 | 5.2 |
| Screen analysis (Tyler mesh), % | | | | |
| +6 | 0.0 | 0.1 | 0.1 | 0.0 |
| −6 +8 | 19.1 | 21.5 | 13.4 | 13.9 |
| −8 +10 | 46.9 | 42.7 | 33.1 | 35.9 |
| −10 +12 | 13.3 | 16.6 | 19.9 | 18.3 |
| −12 +16 | 14.5 | 12.2 | 21.3 | 19.4 |

TABLE I-continued

Pilot-Plant Granulation of 16-41-0 Grade Urea Phosphate Directly from Urea and Wet-Process Phosphoric Acid

| Run No. | DP-10 | DP-11 | | |
|---|---|---|---|---|
| Test No. | 23 | 24 | 25 | 26 |
| −16 +20 | 2.7 | 2.2 | 4.7 | 4.0 |
| −20 | 3.5 | 4.7 | 7.5 | 8.5 |
| Feed temp. °F. | 90 | 106 | 99 | 99 |
| Feed lb/h | 2760 | 4860 | 3900 | 3900 |
| Air through granulator bed | | | | |
| Feed temp, °F. | | 72 | | |
| Feed rate, ft$^3$/min | | 123 | | |
| Exhaust pressure, in H$_2$O | 2.4 | 2.0 | 1.8 | 1.8 |
| Granulator bed temp (discharge end), °F. | 118 | 123 | 120 | 122 |
| Screen analysis (Tyler mesh), % | | | | |
| +6 | 1.1 | 6.8 | 2.5 | 1.1 |
| −6 +8 | 33.9 | 25.2 | 26.6 | 21.7 |
| −8 +10 | 42.7 | 37.7 | 35.7 | 40.2 |
| −10 +12 | 10.8 | 13.5 | 16.2 | 18.0 |
| −12 +16 | 8.8 | 10.9 | 13.9 | 14.0 |
| −16 | 2.7 | 5.9 | 5.1 | 5.0 |
| Product moisture (AOAC), % | 0.7 | 1.3 | 1.2 | 1.3 |
| Dryer Conditions | | | | |
| Drum rotation, r/min | | 7 | | |
| Airflow, at 1 atm and 70° F., ft$^3$/min | 400 | 550 | 740 | 740 |
| Temp, °F. | | | | |
| Air entering | | 200 | | |
| Air exiting | | 120 | | |
| Product exiting | 125 | 123 | 123 | 125 |
| Screen analysis (Tyler mesh), % | | | | |
| +6 | 1.1 | 10.6 | 3.0 | 1.6 |
| −6 +10 | 76.5 | 72.1 | 61.4 | 72.1 |
| −10 +16 | 19.7 | 15.7 | 30.9 | 23.4 |
| −16 | 2.7 | 1.6 | 4.7 | 2.9 |
| Product moisture (AOAC), % | 0.7 | 1.1 | 1.1 | 1.1 |
| Cooler Conditions | | | | |
| Rotation, r/min | | 11 | | |
| Airflow, at 1 atm and 70° F., ft$^3$/min | 1000 | 705 | 705 | 705 |
| Temp, °F. | | | | |
| Air entering | | 70 | | |
| Air exiting | 97 | 107 | 104 | 104 |
| Product exiting | 92 | 110 | 103 | 100 |
| Screen analysis (Tyler mesh), % | | | | |
| +6 | 0.8 | 10.1 | 3.2 | 3.3 |
| −6 +10 | 46.0 | 59.5 | 67.2 | 68.8 |
| −10 +16 | 44.5 | 26.1 | 24.8 | 24.4 |
| −16 | 8.7 | 4.3 | 4.8 | 3.5 |
| Product moisture (AOAC), % | 0.8 | 1.2 | 1.1 | 1.2 |
| Cyclone Dust Collector | | | | |
| Fines collected | | | | |
| Lb/h | — | 10 | 22 | 16 |
| % of nominal production | — | 1 | 3 | 2 |
| Baghouse Dust Collector | | | | |
| Dust collected | | | | |
| Lb/h | 47 | — | — | 70 |
| % of nominal production | 9 | — | 6 | 9 |
| Onsize Product | | | | |
| Screen analysis (Tyler mesh), % | | | | |
| +6 | 0.1 | 0.2 | 0.1 | 0.0 |
| −6 +7 mesh | — | 6.4 | 2.5 | 0.9 |
| −7 +8 mesh | 42.1 | 41.5 | 34.3 | 18.4 |
| −8 +9 mesh | — | 28.8 | 28.4 | 30.9 |
| −9 +10 mesh | 51.0 | 14.8 | 19.7 | 26.2 |
| −10 +12 mesh | 6.1 | 7.5 | 12.8 | 19.8 |
| −12 +14 mesh | — | 0.7 | 2.0 | 3.5 |
| +16 mesh | 0.7 | 0.0 | 0.2 | 0.3 |
| Chemical analysis, % | | | | |
| Total N | 16.3 | 17.1 | 16.5 | 16.6 |
| NH$_3$—N | 0.9 | 0.2 | <0.1 | 0.2 |
| Biuret | 0.6 | 0.18 | 0.10 | 0.12 |
| P$_2$O$_5$ | | | | |
| Total | 40.8 | 40.4 | 41.3 | 41.2 |

TABLE I-continued
Pilot-Plant Granulation of 16-41-0 Grade Urea Phosphate Directly from Urea and Wet-Process Phosphoric Acid

| Run No. | DP-10 | DP-11 | | |
|---|---|---|---|---|
| Test No. | 23 | 24 | 25 | 26 |
| Polyphosphate, % of total | 1.8 | 1.5 | 1.9 | 1.2 |
| Available, % of total | — | 100 | 100 | 100 |
| H$_2$O soluble, % of total | — | 99 | 99 | 99 |
| Water (AOAC), % | 0.7 | 1.1 | 1.0 | 1.0 |
| pH | | 1.5 | | |
| Physical properties[a] | | | | |
| Density, (loose pour), lb/ft$^3$ | 56 | 53 | 58 | 58 |
| Apparent specific density, g/cm$^3$ | 1.64 | 1.64 | 1.63 | 1.62 |
| Angle of repose, degrees | | 39 | | |
| Critical relative humidity, % | | | | |
| At 86° F. | — | — | 50–55 | — |
| At 120° F. | — | — | 40–45 | — |
| Granule crushing strength (−7 +8 mesh granules) of aged (2–4 wk) product, lb | 7.9 | 9.2 | 8.1 | 7.5 |
| Abrasion-shatter (aged), % | | 1.4 | | |
| Bag-storage test results after indicated time (unconditioned, 50-lb bags)[b] | | | | |
| 1 mo | — | — | 000 | — |
| 3 mo | — | — | 000 | — |
| 6 mo | — | — | L2L | — |
| 9 mo | — | — | L00 | — |
| 12 mo | — | — | L00 | — |

[a]Procedures given in TVA Bulletin Y-147.
[b]See Special Report No. S-444. First letter of rating indicates bag set before dropping: 0 = none, L = light, M = medium, H = hard. Number indicates percent of plus 2-mesh lumps after two drops of bag. Last letter indicates hardness of lumps.

Subsequent to my earlier work as reported in my parent application '096, supra, additional chemical and petrographic analyses have shown that the phosphatic compound cited in Example VI and in original claims 5, 6, and 7 of said application was not primarily urea phosphate but was mainly monoammonium phosphate. I now believe that free ammonia liberated by hydrolysis of some of the urea and the small amount of ammonia that was fed beneath the discharge end of the granulation bed, reacted with acid and/or urea phosphate to form monoammonium phosphate.

Based on chemical analyses, percent of the total acid fed to the process and existing as urea phosphate in the product, is calculated according to the following equation:

$$\% \text{ of acid as urea phosphate in product} = 100 - \frac{\frac{\% \text{ ammonia nitrogen}}{14.01}}{\frac{\% \text{ total P}_2\text{O}_5 \times 1.38}{98}}$$

then

% of acid as monoammonium phosphate in product = 100 − urea phosphate.

In my subsequent work, continuous granulation tests of urea-urea phosphate with nutrient ratios 1:1:0 and 2:1:0 have not been successful. Overwetting in the granulator has been the problem in attempts to granulate these grades. I now believe that the difficulty encountered in attempts to granulate these ratio grades can be explained with the aid of published data that show that the freezing temperature of mixtures of urea and urea phosphate with 20 to 60 percent urea is severely depressed in the presence of water and that the lowest solidification temperature is with 40 percent urea which would result in a 1:1:0 N:P$_2$O$_5$:K$_2$O ratio. When a urea-urea phosphate mixture contains about 70 percent urea, corresponding to N:P$_2$O$_5$:K$_2$O ratio of 3:1:0, the freezing temperature of the mixture is about the same as that for pure urea phosphate. Results of additional bench-scale continuous plant studies now have defined operating conditions so as to minimize hydrolysis and cause upwards of 70 percent of the acid in the 3:1:0 nutrient ratio grade to be in the urea phosphate form. It should perhaps be pointed out that up through the results of my latest work reported herein, the critical relative humidity of a 3:1:0 nutrient ratio grade formulated from urea and wet-process phosphoric acid, according to this embodiment of my invention, is in the range of 40 to 45 percent at 86° F. and, therefore, the production operation must be carried out in a climatic controlled environment.

EXAMPLE VII

In this series of tests, urea phosphate granular fertilizer with a nitrogen:P$_2$O$_5$ weight ratio of 3:1 was made according to the present invention from urea solution of 85 to 90 percent urea concentration and merchant-grade (54 percent P$_2$O$_5$) wet-process phosphoric acid. Extra water equivalent to that contained in filter-grade wet-process acid or that contained in unconcentrated urea from a synthesis plant is required for adequate fluidity in the reactor. In these tests, the same equipment and basic procedure as described in Example I, supra, were used. For these tests, the liquid level in the reactor was lowered to a level so that the maximum residence time in the unit was 10 minutes. The urea solution was fed to the reactor at about 230° F. and the acid was fed at about 75° F. The reactor mixture was controlled at 190° F. This operational change appeared to minimize hydrolysis of the feed urea and to allow adequate time for water to dissipate. The product, nominal 36-12-0, produced was of the preferable granular form. Calculations (above method) based on chemical analyses of reaction mixture and product show that upwards of about 70 percent of the total acid fed to the process had reacted with urea to form urea phosphate. The product was soft and tacky and caused handling problems.

EXAMPLE VIII

In another series of tests, urea-urea phosphate with a nitrogen:$P_2O_5$ weight ratio of 3:1 was made according to the present invention from urea melt and 54 percent $P_2O_5$ wet-process phosphoric acid. In this series of tests, the same equipment and the same basic procedures were used as those described in Example I, supra. In carrying out these tests, the proportions of materials fed to the reactor was for a 1:1 mole ratio of urea to phosphoric acid, the remaining proportion of urea for a 3:1 nutrient ratio grade product was fed onto the granulation bed. Calculations, according to the formula in Example VII, supra, based on chemical analysis showed that upwards of 75 percent of the acid used in the tests was combined with urea in the form of urea phosphate and that the remainder was combined with ammonia in the form of monoammonium phosphate. Nominal grade of these products was 36-12-0, moisture content was about 1.0 percent. The critical relative humidities of the 3:1:0 ratio grade products is in the range of 40 to 45 percent at 86° F.; therefore, special precautions, in regard to humidity of process air and environment, must be considered.

EXAMPLE IX

Negative Example—No Sweep Air Utilized

In this series of tests, using the same equipment and procedures as in Example I, supra, but without utilizing the novel air-sweep process, solid urea and merchant-grade (about 54 percent $P_2O_5$) wet-process phosphoric acid were fed, in proportions for a 1:1 urea to acid mole ratio, to the reactor, but granulation of the resultant urea phosphate mixture was not achieved even with applied heat to the granulation bed. In these tests, heat of reaction caused the reactor to operate at about 145° F.; however, the free moisture content of the resultant urea phosphate mixture feeding to the granulator was 8.4 to 10.1 percent by weight, and consequently, granulation did not occur, but caused the starting dry recycle material, i.e., the "heel," in the granulator to overwet and to become a muddy mass even when heat was applied to the granulator to maintain a granulation bed temperature of 170° F. The same results were obtained when applied heat, at the reactor, was used to bring the urea-phosphate mixture temperature to 200° F.

The feedstock and process conditions that are detailed in the above examples are briefly summarized in Table II below.

TABLE II

| Example No. | Feedstock Urea | Acid concentration % $P_2O_5$ | Temperature, °F. Reactor | Process air | Granulator | Number of tests | Air to Material Ratio Reactor CFM:f³ solution | Granulator CFM:ft³ granulation bed |
|---|---|---|---|---|---|---|---|---|
| I | Solid | 53.2 | 200 | 75 | 85 | 1 | 7:1 | 14.5:1 |
| II | Solid | 53.2 | 200 | 75–185 | 136 | 3 | 7:1 | 14.5:1 |
| III | Melt | 53.2 | 185–200 | 75–160 | 95 | 9 | 7:1 | 14.5:1 |
| IV | 62% solution | 53.7 | 185 | 75 | 85 | 3 | 7:1 | 14.5:1 |
| V | 75% solution | 40.0 | 183 | 75 | 90 | 3 | 7:1 | 14.5:1 |
| VI | 85% solution | 53.2 | 200 | 75 | 85 | 9 | 7:1 | 14.5:1 |
| VII | Solid | 53.2 | 145 and 200 | None | No granulation, over wetting | 10 | None | None |

INVENTION PARAMETERS

After sifting and winnowing through the data herein presented as well as other results and operations of my novel process for producing granular urea phosphate from urea and wet-process phorphoric acid, without removal of the cogeneric acid impurities, eminently suitable for subsequent use by both the solids and solutions segments of the fertilizer industry, the operation variables and preferred conditions for carrying out my process are summarized below:

| Variables | Limits | Preferred | Most preferred |
|---|---|---|---|
| Feedstock | | | |
| Urea | | | |
| % concentration | 75–100 | 85–100 | 100 |
| Temperature, °F. | 32–300 | 280–290 | 285 |
| Wet-process $H_3PO_4$ | | | |
| % $P_2O_5$ concentration | 30–65 | 40–54 | 54 |
| Temperature, °F. | 32–220 | 150–250 | 200 |
| Recycle | | | |
| Particle size, Tyler | −6 +200 | −6 +100 | −6 +100 |
| Temperature, °F. | 32–150 | 75–100 | 90 |
| Recycle rate | 3:1–10:1 | 3:1–5:1 | 3:1–5:1 |
| Reactor slurry temperature | 165–215 | 180–210 | 200 |
| Reactor residence time, in minutes | 20–40 | 25–30 | 20 |
| Granulator bed temperature | 75–125 | 80–115 | 90–100 |
| Granulator residence time, in minutes | 3–10 | 4–8 | 5 |
| Sweep air | | | |
| In reactor, CFM/CF of granules | 4–10 | 6–8 | 7 |
| In granulator, | 10–20 | 12–16 | 14 |
| Product | | | |
| Particle size, Tyler | −4 +20 | −6 +10 | −6 +10 |
| Temperature, °F. | 50–120 | 65–90 | 65–90 |
| N:$P_2O_5$ weight ratio (Theoretical grade 17-44-0, i.e., N:$P_2O_5$ b- wt = 1:2.6) | 5:1–1:2.6 | 5:1–2:1 | 3:1–2:1 |
| | | Same | |

While I have shown and described particular embodiments of my invention, modifications and variations will occur to those skilled in the art. I wish it to be understood, therefore, that the appended claims are intended to cover such modifications and variations which are within the true scope and spirit of my invention.

What I claim as new and desire to secure by Letters Patent of the United States is:

1. A process for the direct production, from wet-process phosphoric acid containing the congeneric impurities thereof therein and urea, of granular urea phosphate fertilizers having a predetermined closely controlled particle size range and excellent handling characteristics including relatively high granular crushing strength, said granular urea phosphate being eminently suitable, either alone or in homogeneous admixture with urea, for soil surface application agronomic particles, which process comprises the steps of:

(1) introducing into reactor means predetermined quantities of wet-process phosphoric acid and urea to effect a resulting slurry therein of urea phosphate, said predetermined quantities of said acid and said urea proportioned in said resulting slurry to effect a urea:$H_3PO_4$ mole ratio of about 1:1;

(2) mechanically agitating said slurry in said reactor means and introducing thereinto near the bottom portion thereof a stream of sweep air, the relative volume of said sweep air to the relative volume of said urea phosphate slurry ranging from about 4.0:1 to about 10:1, and being sufficient to physically remove from about 50 percent to about 70 percent of the free water in said urea phosphate slurry;

(3) subsequently removing from said reactor means at least a portion of the resulting dehydrated urea phosphate slurry material and introducing same into granulator means, together with recycled fines from a later-mentioned sizing step and predetermined quantities of additional sweep air introduced beneath the resulting granulation bed in said granulator means, said additional sweep air being in volumetric proportions to said granules in said granulator means ranging from about 10:1 to about 20:1 and being sufficient to remove substantially all of the remaining free moisture in said urea phosphate slurry introduced thereinto; and (4) removing at least a portion of essentially dry granular urea phosphate product from said granulator means and introducing same into drying, cooling, and sizing means wherefrom product size material is obtained and undersize as well as crushed initially oversize material is recycled to said granulator means;

said process characterized by the fact that at least about 99 percent of the free water present in said urea phosphate slurry formed in said reactor means is removed physically via sweep air introduced into both said reactor means and said granulator means and substantially no external heat energy is expended therein for such purposes.

2. The process of claim 1 wherein said urea ranges from about 60 to about 100 percent concentration and is introduced into said reactor means at a temperature in the range from about 32° F. to about 300° F., and wherein said wet-process phosphoric acid ranges from about 30 to about 65 percent $P_2O_5$ and is introduced into said reactor means at a temperature in the range from about 32° F. to about 220° F.

3. The process of claim 1 wherein said urea ranges from about 75 percent to about 99 percent concentration and is introduced into said reactor means at a temperature in the range from about 260° F. to about 290° F., and wherein said wet-process phosphoric acid ranges from about 40 to about 54 percent $P_2O_5$ and is introduced into said reactor means at a temperature in the range from about 50° F. to about 125° F.

4. The process of claim 1 wherein said urea is about 75 percent concentration and is introduced into said reactor means at a temperature of about 285° F., and wherein said wet-process phosphoric acid is about 54 percent $P_2O_5$ and is introduced into said reactor means at a temperature of about 80° F.

5. The process of claim 1 wherein the predetermined quantities of said wet-process phosphoric acid and said urea are adjusted and fed to the reactor means in proportion for 1 mole of urea per 1 mole of phosphoric acid and additional urea is subsequently fed to the granulator means so as to obtain in the resulting granules comprising said product a homogeneous mixture of crystalline urea, crystalline urea phosphate, and relatively small predetermined amounts of (equivalent to about 30 percent of the acid) monoammonium phosphate, said granules having a N:$P_2O_5$ weight ratio ranging from about 3:1 to about 4:1, said process characterized by the fact that said N:$P_2O_5$ weight ratio range of said urea-urea phosphate fertilizer granular material renders same eminently suitable for soil surface application by virtue of the fact that said crystalline urea phosphate juxtaposed said crystalline urea has an ameliorating action thereon sufficient to substantially eliminate ammonia volatilization losses when same is applied to such soil surfaces for a predetermined time and subsequently eliminates main and lateral root damage to relatively young seedlings when same are germinated in soil which has been banded with said material.

6. The process of claim 5 wherein said predetermined quantities of said wet-process phosphoric acid and urea are adjusted so as to obtain in the overall product an N:$P_2O_5$ weight ratio ranging from about 3:1 to about 4:1.

7. The process of claim 2, or 3, or 4, or 5, or 6, wherein said sweep air in said reactor means ranges from about 6:1 to about 8:1 and in said granulator ranges from about 12:1 to about 16:1 as cubic feet per minute per cubic foot of slurry and granules, respectively.

8. The process of claim 2, or 3, or 4, or 5, or 6 wherein said sweep air in said reactor means is about 7:1 and in said granulator is about 14:1 as cubic feet per minute per cubic foot of slurry and granules, respectively.

* * * * *